(12) United States Patent
Kawanishi et al.

(10) Patent No.: US 7,522,844 B2
(45) Date of Patent: Apr. 21, 2009

(54) MULTIPLE-WAVELENGTH OPTICAL MODULATION APPARATUS

(75) Inventors: Tetsuya Kawanishi, Koganei (JP); Masayuki Izutsu, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 390 days.

(21) Appl. No.: 11/103,494

(22) Filed: Apr. 12, 2005

(65) Prior Publication Data

US 2005/0238366 A1   Oct. 27, 2005

(30) Foreign Application Priority Data

Apr. 12, 2004   (JP) ............... 2004-117067

(51) Int. Cl.
*H04B 10/04* (2006.01)
(52) U.S. Cl. ...................... 398/183
(58) Field of Classification Search ......... 398/182–201; 359/308, 237, 238, 276, 278, 603, 634
See application file for complete search history.

(56) References Cited

U.S. PATENT DOCUMENTS

| 3,408,498 | A | * | 10/1968 | Ohm ..................... 359/238 |
| 4,208,091 | A | * | 6/1980 | Cheo et al. ............... 385/3 |
| 6,600,588 | B2 | * | 7/2003 | Kawanishi ............... 359/246 |
| 2002/0191912 | A1 | * | 12/2002 | Robinson et al. ........... 385/37 |

FOREIGN PATENT DOCUMENTS

| JP | 2002-23209 | 1/2002 |
| JP | 2002-318374 | 10/2002 |

OTHER PUBLICATIONS

Motonobu Kourogi, et al., "Generation and application of wide span optical frequency combs", JSAP, vol. 67, No. 5, 1998, pp. 551-554 (with partial English translation).
Sadayuki Matsumoto, et al., "Tunable dispersion equalizer with a divided thin film heater", Optical Fiber Communication Conference and Exhibit, Technical Digest Series, Conference Edition, Mar. 20, 2001, pp. TuS4-1, TuS4-2 and TuS4-3.

* cited by examiner

*Primary Examiner*—Quan-Zhen Wang
(74) *Attorney, Agent, or Firm*—Oblon, Spivak, McClelland, Maier & Neustadt, P.C.

(57) ABSTRACT

An apparatus is provided for using modulation signals to optically modulate a plural input lightwaves of multiple frequencies, including an input filter, an optical modulator configured to simultaneously modulate the plural input lightwaves by their respective modulation signals, and an output filter disposed on a single optical path; a multiple round-trip optical path formed by the plural input lightwaves input through the input filter being reflected in round trips by the input filter and output filter and being modulated by the modulator each time the lightwaves makes a round trip and output through the output filter or the input filter when the lightwaves have reached a frequency determined by the output filter or the input filter. The time required for each light component of channel n to make a round trip is an integer multiple of one period of each modulation signal ($=1/F_n$).

13 Claims, 11 Drawing Sheets

Prior art

MULTIPLE-WAVELENGTH OPTICAL MODULATION APPARATUS

BACKGROUND OF THE INVENTION

1. Field of the Invention

The present invention relates to an apparatus to optically modulate light having a plurality of frequency bands corresponding to each modulation signals using a single optical modulator.

2. Description of the Prior Art

Figure 10A:
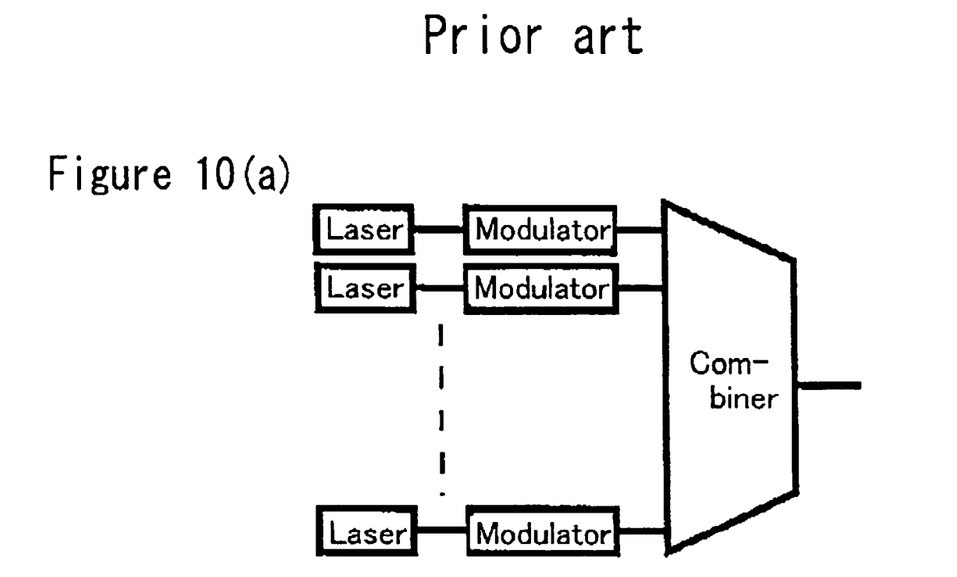
FIG. 10 is a block diagram of an example of a conventional wavelength multiplexing system.
Figure 10B:
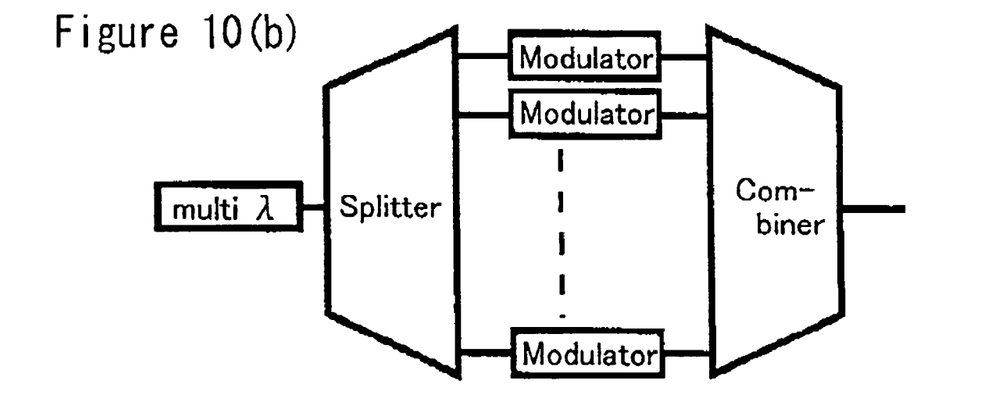

Wavelength multiplexing systems are being used to increase capacity in the area of optical fiber communications. As shown in FIG. 10, a wavelength multiplexing system needs to have a light source and an optical modulator for each wavelength, which makes the transmission section complicated.

Proposals for making the light source simple include that disclosed in JP-A 2002-2309, which describes a multiple-wavelength light source that produces multiple-wavelength components simultaneously. However, the optical modulator still needs the number of wavelength multiplexed channels.

Figure 11:
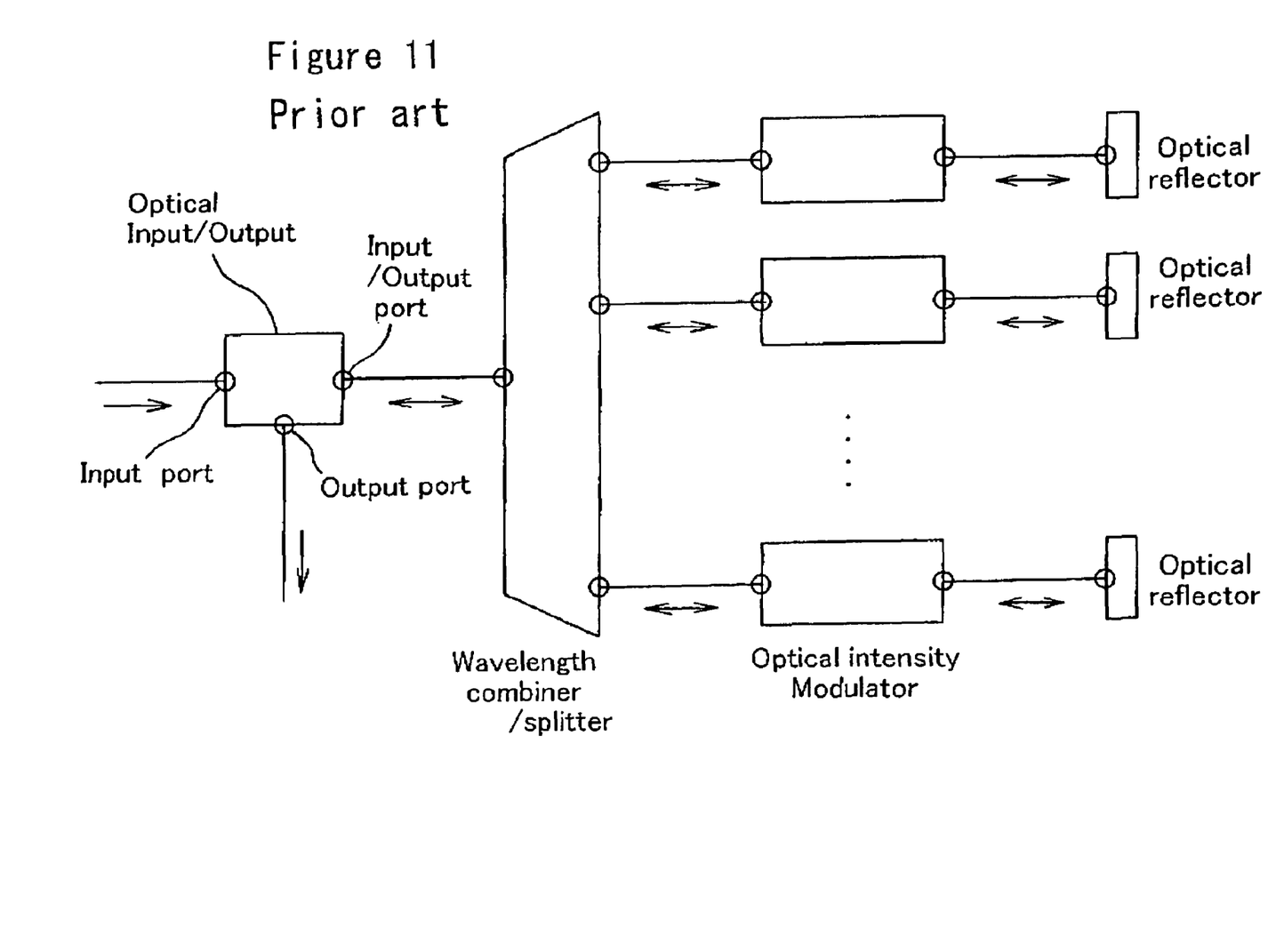
FIG. 11 is a block diagram of a conventional multiple-wavelength optical modulation apparatus.

Japanese Unexamined Patent Application Publication 2002-318374 discloses a multiple-wavelength optical modulation apparatus, which is shown in FIG. 11. The apparatus uses a Wavelength-Division-Multiplexing mux-demux component to split an incoming optical signal into optical carrier wave signals, and has optical intensity modulators corresponding to the number of carrier waves, and an equal number of optical reflectors. In this case too, the use of numerous intensity modulators makes the apparatus configuration complex.

A paper ("Generation and application of wide-span optical frequency combs," Korogi, Otsu, JSAP Vol. 67 No. 5, pp. 551-554 (1998)) describes a wide-span optical frequency comb generator using an optical modulator, but this is for one wavelength, and therefore differs from the present invention.

An object of this invention is to provide an apparatus for using modulation signals to optically modulate light having a plurality of frequency bands by respective modulation signals, using a single optical modulator.

SUMMARY OF THE INVENTION

The present invention is based on a new principle. First the principle of the invention can be explained as follows.

Figures 1A, 1B, 1C:
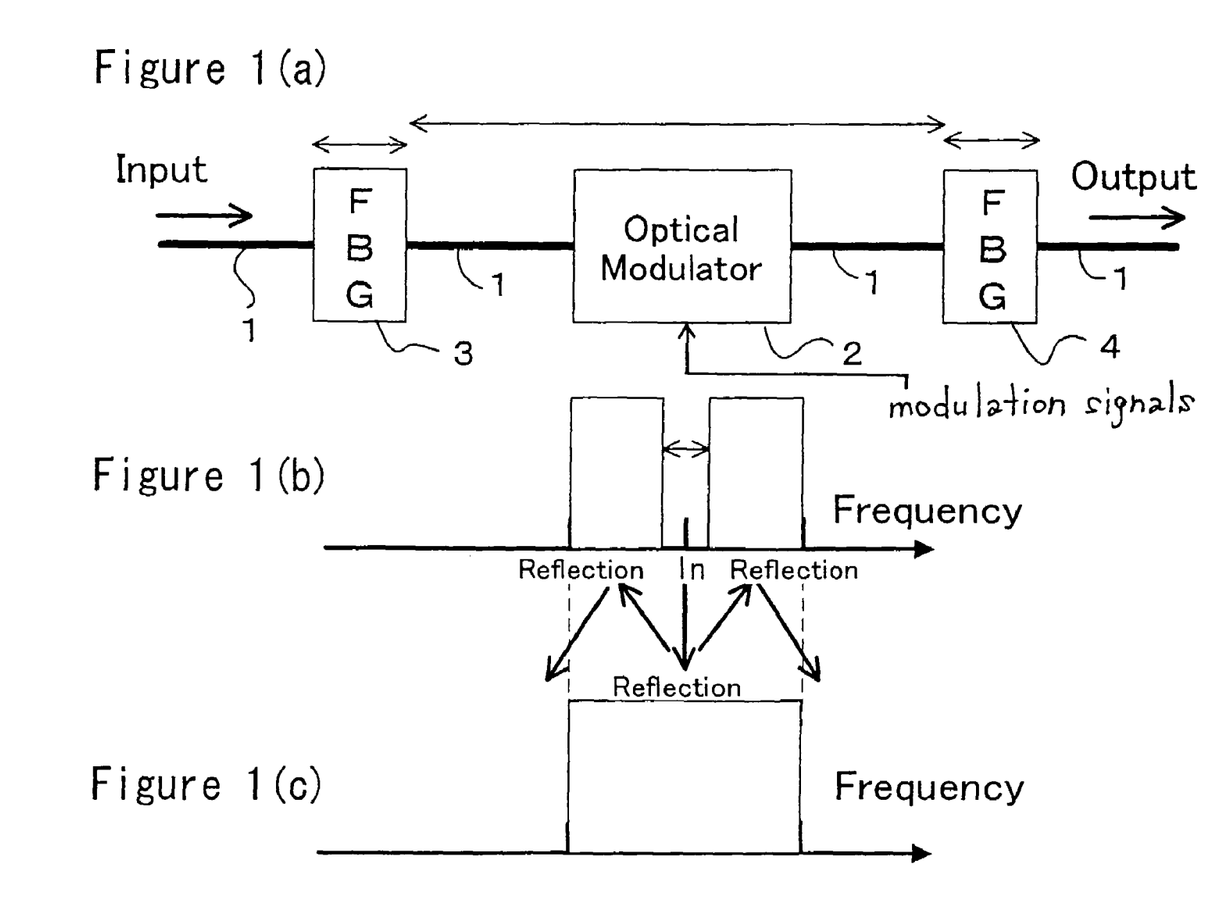
FIG. 1(a) is a schematic diagram of an embodiment of a multiple-wavelength optical modulation apparatus that constitutes a unit configuration of the present invention.
FIG. 1(b) is an example of the reflection characteristics of the FBG 3.
FIG. 1(c) is an example of the reflection characteristics of the FBG 4.

FIG. 1(a) is a schematic diagram of an optical modulation apparatus constituting a unit configuration of the present invention. A fiber Bragg grating (FBG) 3 comprising an input-side reflection means and a FBG 4 comprising an output-side reflection means are provided on an optical fiber path 1. Located between the two reflection means is an optical modulator 2 comprising an optical intensity modulation means. The optical modulator 2 is a resonant type intensity modulator having a modulation electrode that is shorter than the wavelength of the modulation signal. The FBG 4 has the reflection band shown in FIG. 1 (c), and the FBG 3 has two reflection bands and a transmission band between the two reflection bands as shown in FIG. 1(b). The reflection band of FBG 4 spans the same width as the two reflection bands of FBG 3. FBG 3 and FBG 4 configure an optical resonator.

A laser beam having a wavelength that falls within the above transmission band of the FBG 3 is input to the optical path 1. After passing through the FBG 3, the beam is intensity modulated by the optical modulator 2 to form a signal with a sideband that is reflected by the FBG 4. The signal thus reflected is again modulated by the optical modulator 2 and reaches the FBG 4 as an optical carrier wave with first and second order sidebands. The carrier wave travels on to the input part of the optical path and is discarded outside the resonator. The sidebands are again reflected and modulated, thereby reaching the FBG 3 as an optical signal having first, second and third order sidebands and a weak optical carrier wave component. If the third order sideband is outside the reflection band of the FBG 3, only the second order sideband is transmitted by the FBG 3 and thereby output to the exterior of the optical resonator. Thus reflected, the next optical signal returns to the FBG 3 as a signal having first, second and third order sidebands and a weak carrier wave component, and the third order component is output from the resonator. In this way, when the optical signal is output after being reflected at least three times, a third order sideband is output.

Figure 2A:
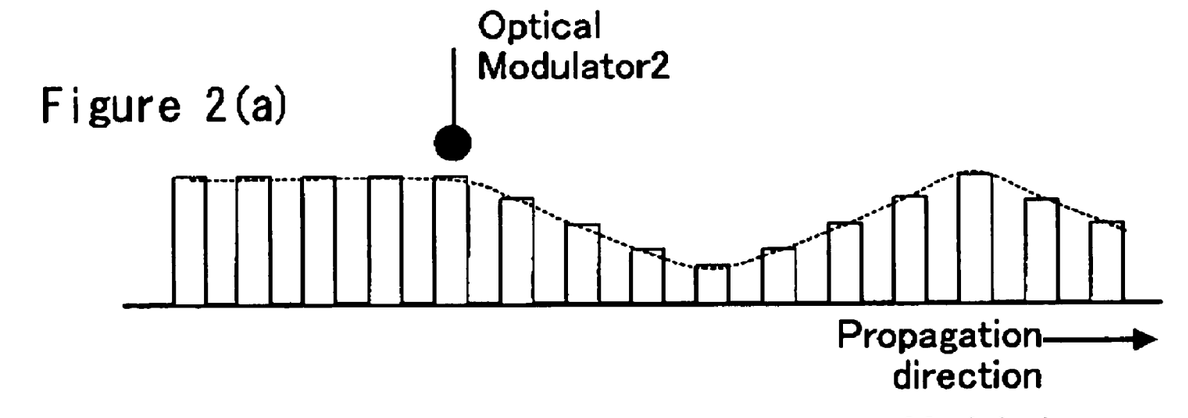
FIG. 2(a) is a schematic diagram of the propagation state of intensity modulated optical pulses.
Figure 2B:
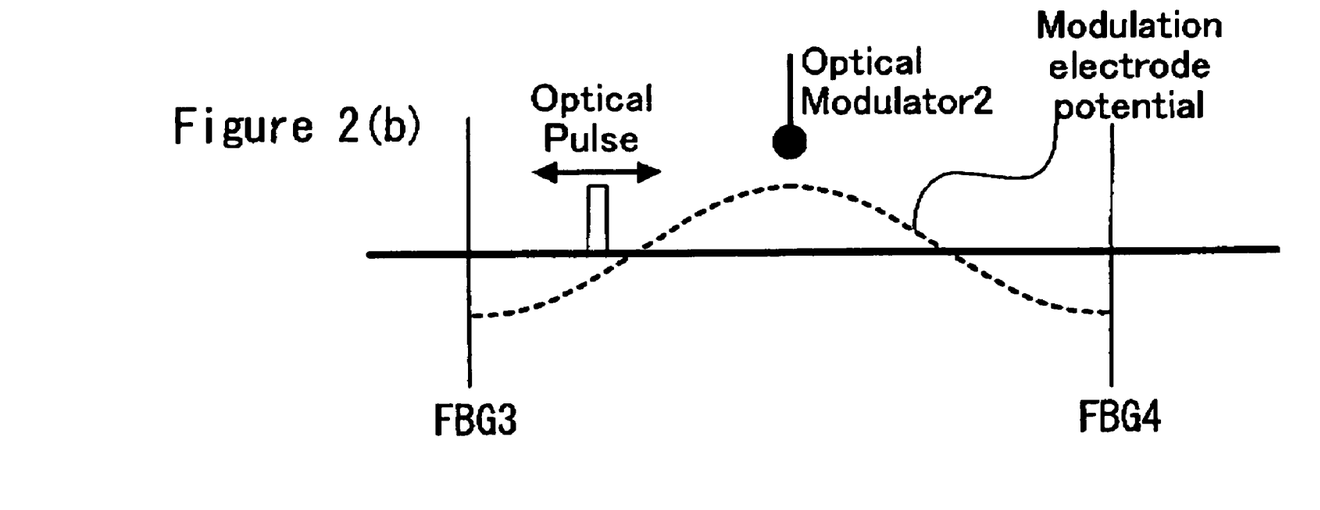
FIG. 2(b) shows the intensity of a modulation signal received by an optical pulse between two reflectors.

A case in which light pulses are modulated by an intensity modulator, as shown in FIG. 2(a), will now be considered. It is known that when the modulation signal is a sine wave, a line connecting the peak values will be a sine wave. It is also known that, if the horizontal axis is pulse location and the vertical axis is the modulation electrode potential at that point, a sine wave is obtained. FIG. 2(b) shows when this is plotted as optical pulse propagation in the resonator. FIG. 2(b) shows when the optical pulse first passes through the optical modulator when the modulation electrode potential is at a peak, and the potential is also at a peak during the second and third passes. It can be understood that in this case, the strongest third order sideband is obtained. Thus, it can be understood that it is desirable for the period of the modulation signal to be equal to a natural-number-part-of-one of the time required for a pulse to make a round trip between the modulator and the FBG 3 or FBG 4. Particularly when the period of the modulation signal is an odd (or even) fraction of the time required for the round trip, it is desirable for the phase of the modulation signal by which the optical wave is modulated be reversed (or same-phase) between the outbound and inbound travel.

FIG. 2(b) shows an example in which the modulation electrode is located at the midpoint between the FBG 3 and FBG 4. However, the modulation electrode does not have to be at the midpoint, and may be located more towards the FBG 3 or FBG 4 side. In such a case, however, it is desirable that the modulation signal that modulates an optical wave traveling from the FBG 3 to the FBG 4 and the modulation signal that modulates the optical wave traveling in the reverse diction be provided with a phase difference according to the positional offset.

In cases where sidebands are thus obtained, the frequency band of the modulation signals that can be used is determined by the length of the optical path of the resonator. This means that even when the modulation signal comprises superposed signals of various frequencies, the modulation signal frequency can be selected by adjusting the length of the resonator's optical path.

The present invention will be summarized next. In accordance with the present invention, the multiple-wavelength optical modulation apparatus is attained as follows. A plurality of lightwaves are input and each of the lightwaves is modulated by a modulation signal each having a subcarrier wave. If a number is assigned to each lightwave, and the same number is assigned to the corresponding modulation signal. The number is also used as the channel number. There are cases in which one lightwave is modulated by different modulation signals, so if N is the number of modulation signals, the number of lightwaves is not greater than N.

Thus, the present invention attains the above object by providing a multiple wavelength optical modulation apparatus in which with respect to a natural number n that is not higher than a number N of modulation signals that is not lower than a number of input lightwaves, fn is input light component of channel n, Fn is modulation frequency, An is a lower sideband order and Bn is an upper sideband order corresponding to sideband channels generated by modulation, the method comprising: disposing an input filter, an optical modulator and an output filter on a single optical path, reflecting light input through the input filter in round trips between the input filter and the output filter, modulating the light during each round trip and outputting the light through the output filter or the input filter when the light has reached a frequency determined by the output filter or the input filter, wherein the time required for each light component of channel n to make a round trip is an integer multiple of one period of each modulation signal ($=1/F_n$).

It is desirable to use matching by having the optical modulator reverse-phase modulate a light component traveling in one direction when the time required for each light component of channel n to make a round trip (hereinafter "round-trip time") is an odd multiple of one period ($=1/F_n$), and in-phase modulate a light component traveling in both directions when the time required for each light component of channel n to travel both ways is an even multiple of one period ($=1/F_n$).

It is also desirable that conditions be met such as that with respect to an integer $i_k$ from $-(A_n-1)$ to $(B_n-1)$ that is other than zero, there is no overlap with respect to the sum, $f_n+i_kF_n$, and that the time required for each light component of channel n to make the round trip does not coincide with an integer multiple of one period of a modulation frequency of another channel. However, with regard to the latter, operation is possible in the following case even if there is such coincidence. That is, in a case in which, when two channels overlap and the round-trip time of one is an odd multiple and that of the other is an even multiple, and (amount of delay)=$(1F_n) \times P=(1/Fm) \times Q$, one of P and Q is an odd number and the other is an even number. Also, in cases in which slight crosstalk is permissible, it is not essential that the above overlap and coincidence conditions be fully met.

The apparatus may be comprised a plurality of unit configurations each constituted by an output filter element having a predetermined reflection band, and an input filter element having first and second reflection bands each of which has a reflection frequency band in common with the predetermined reflection band and a transmission band between the first and second reflection bands, wherein the plurality of unit configurations, the output filter elements of which each have a different reflection band, are disposed on a single optical path and share the same intensity modulator or phase modulator. The input filter element and output filter element may each be constituted as a plurality of filter elements.

The input filter may be a filter having first and second reflection bands and a transmission band between the first and second reflection bands via which light is input, and the output filter may have comb-teeth-shaped reflection characteristic portions in which the number of comb teeth is the same as the number of modulation signals, the comb-teeth-shaped reflection characteristic portions each have a free spectral range reflection characteristic that is a natural number multiple of each modulation frequency or is a natural-number-part-of-one of each modulation frequency, and any among a carrier wave, a first order sideband and a higher order sideband obtained by modulation of an input lightwave is reflected by a comb-teeth-shaped reflection characteristic portion that is different for each modulation signal. In the first reflection, an input lightwave is always reflected at the same comb-teeth-shaped reflection characteristic portion.

The output filter may be a filter having a predetermined reflection band that can reflect an input lightwave, and the input filter may have comb-teeth-shaped reflection characteristic portions in which the number of comb teeth is the same as the number of modulation signals, the comb-teeth-shaped reflection characteristic portions each have a fringe and pitch free spectral range (hereinafter "FSR") reflection characteristic that is a natural number multiple of two or more of each modulation frequency, and any among a carrier wave, a first order sideband and a higher order sideband obtained by successive modulations of an input lightwave is reflected by a comb-teeth-shaped reflection characteristic portion that is different for each modulation signal.

Further features of the invention, its nature and various advantages will be more apparent from the accompanying drawings and following detailed description of the invention.

BRIEF DESCRIPTION OF THE DRAWINGS

FIG. 5(b) shows the reflection characteristics with respect to incident light of wavelength λa.

FIG. 6(b) shows the reflection characteristics with respect to incident light of wavelength λa.

FIG. 8(b) shows the reflection characteristics with respect to incident light of wavelength λa.

DESCRIPTION OF THE PREFERRED EMBODIMENT

Embodiments of the present invention will now be explained with reference to the drawings. In the explanations, parts that are the same or similar are denoted using the same symbols, unless stated otherwise.

EXAMPLE 1

Figure 3A:
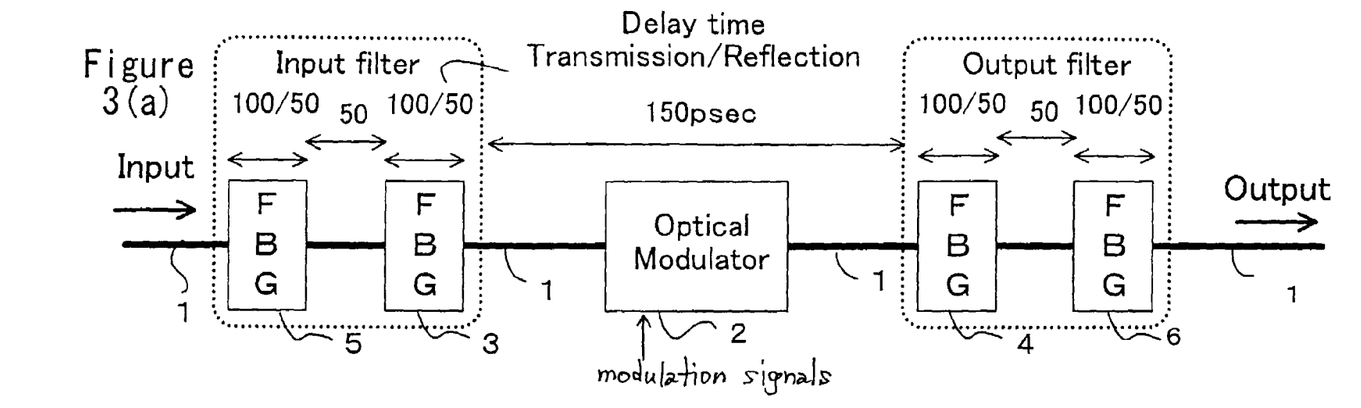
FIG. 3(a) is a block diagram of an optical modulation apparatus that uses one modulator to modulate light of two frequencies.
Figure 3B:
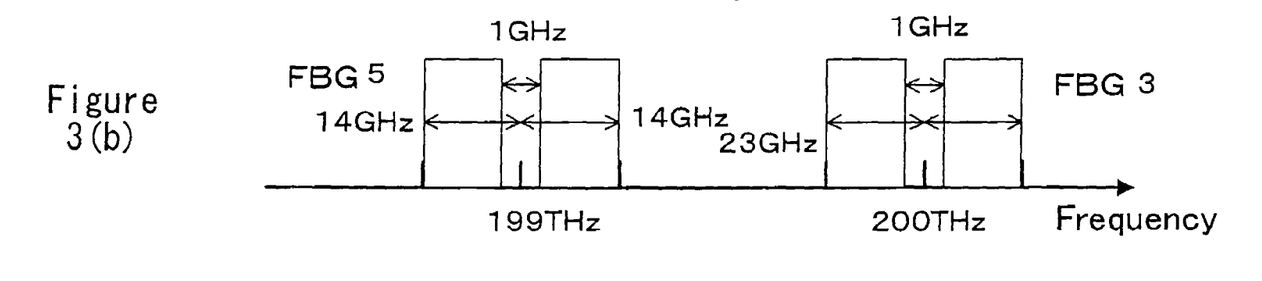
FIG. 3(b) shows the reflection characteristics of FBGs 5 and 3.
Figure 3C:
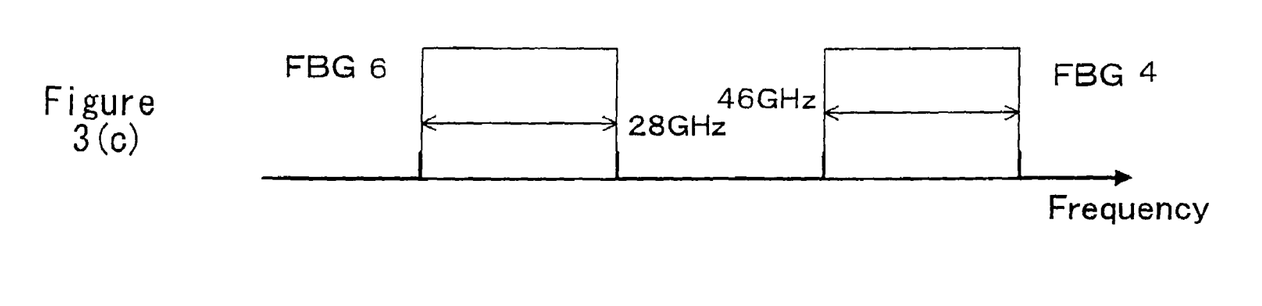
FIG. 3(c) shows the reflection characteristics of FBGs 6 and 4.

First, the invention will be explained with reference to the optical modulation apparatus of the invention shown in FIG. 3. FIG. 3 (a) shows a configuration that uses a single modulator to modulate light having a frequency of 200 THz and light having a frequency of 199 THz. Arranged along an optical path 1 are an input end, an input side FBG 5, an input side FBG 3, an optical modulator 2, an output side FBG 4, an output side FBG 6 and an output end. As shown in FIG. 3(b), FBG 5 has two 13.5 GHz reflection bands and a 1 GHz transmission band between the reflection bands, and FBG 3 has two 22.5 GHz reflection bands and a 1 GHz transmission band between the reflection bands. FBG 6 and FBG 4 have reflection bands corresponding to those of FBG 5 and FBG 3, respectively, without the transmission bands. The upper and lower limits of the reflection bands do not have to be the same in the FBG 6 and FBG 4; the manufacturing error only needs to be in the order of half the modulation frequency. Moreover, the transmission on bands do not have to transmit the light perfectly, but may have a small amount of reflectivity.

The time required for an optical signal to propagate through the FBGs, optical modulator and optical path and the like is denoted as a delay time from the input end. The apparatus is assumed to be fabricated to have the following optical propagation delay times. In the case of FBGs 3, 4, 5 and 6, the delay time is 100 psec (transmission time)/50 psec (reflection time); the delay time between FBG 3 and FBG 4, which includes the optical modulator, is 150 psec, and the delay time between FBG 5 and FBG 3, as well as between FBG 4 and FBG 6, is 50 psec. The time required for an optical signal to make a round trip in the optical resonator 1 formed by FBG 3 and FBG 4 is 400 psec, and the time required for an optical signal to make a round trip in the optical resonator 2 formed by FBG 5 and FBG 6 is 1000 psec.

Taking the optical resonator 1 as modulating on a round-trip basis, from the above delay time (400 psec), a 5 GHz modulation signal (200 psec period) is applied In the case of the optical modulator 2, also modulating on a round-trip basis, a 1 GHz (1000 psec period) modulation signal is applied, but it is clear, however, that modulation on a round-trip basis can be carried out using a modulation signal having a frequency corresponding to a harmonic thereof. Therefore, these modulation signals can be simultaneously applied to the optical modulator 2. Even when simultaneously applied, a 5 GHz modulation signal is selected for the optical resonator 1 and a 4 GHz (250 psec period) for the optical resonator 2. Accordingly, the limitation of the output filter is received, and a fifth order sideband is output from the optical resonator 1 to the output end, and fourth and fifth order sidebands are output from the optical resonator 2 to the output end.

From the above discussion, it can readily be understood that even when a 5 GHz carrier wave or a 4 GHz carrier wave modulated to obtain a signal with a distribution around 5 GHz or 4 GHz is used as the 5 GHz or 4 GHz modulation signal, modulation can be established with negligible error.

Figure 5A:
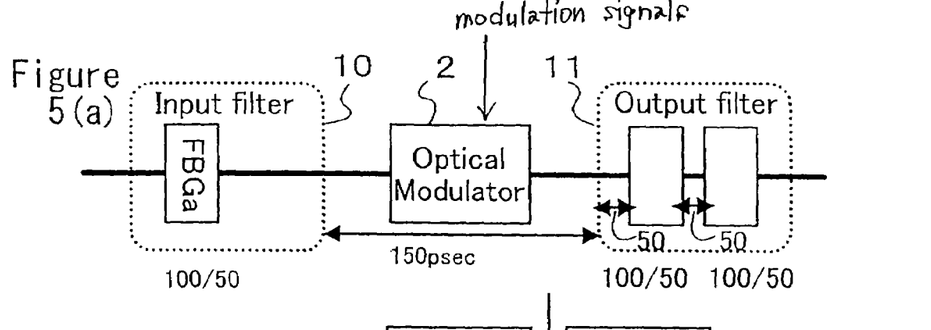
FIG. 5(a) is a schematic diagram of another embodiment of a multiple-wavelength optical modulation apparatus according to the present invention.

In the case of the optical modulation apparatus shown in FIG. 3, the wavelength of the input laser beam and the frequency of the modulation signal have to be matched. This can be done by using the path length adjustment element described in the paper ("Tunable dispersion equalizer with a divided thin film heater," S. Matsumoto, et al., Optical Fiber Communication Conference and Exhibit, Technical Digest Series, Conference Edition, TuS4-1-TuS4-3, Mar. 20, 2001), in which the element uses thermal expansion to adjust the length of the optical path. Although there are various types of such elements, the important thing is that it has to be small enough to fit on the optical path between FBGs. Also, as shown in FIG. 5, it is desirable for each of the optical modulators to be provided with such optical path length adjustment means.

In the apparatus example described in the above, two optical resonators share the one optical modulator. Clearly, however, optical signals having numerous wavelengths can be modulated together by using a configuration in which one optical modulator is shared by numerous optical resonators.

EXAMPLE 2

The above example relates to the use of input/output filters having uniform reflection characteristics that span the wavelength zone being utilized. However, the same kind of function can be achieved using the reflection characteristics of a comb filter, as described in the following.

Figure 4A:
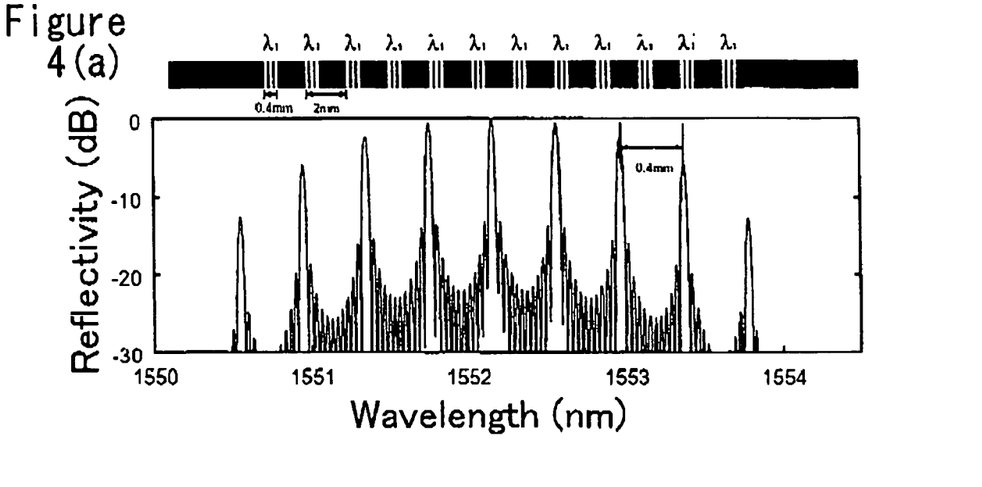
FIG. 4(a) shows the reflection characteristics of a superlattice type fiber grating using one type of FBG.
Figure 4B:
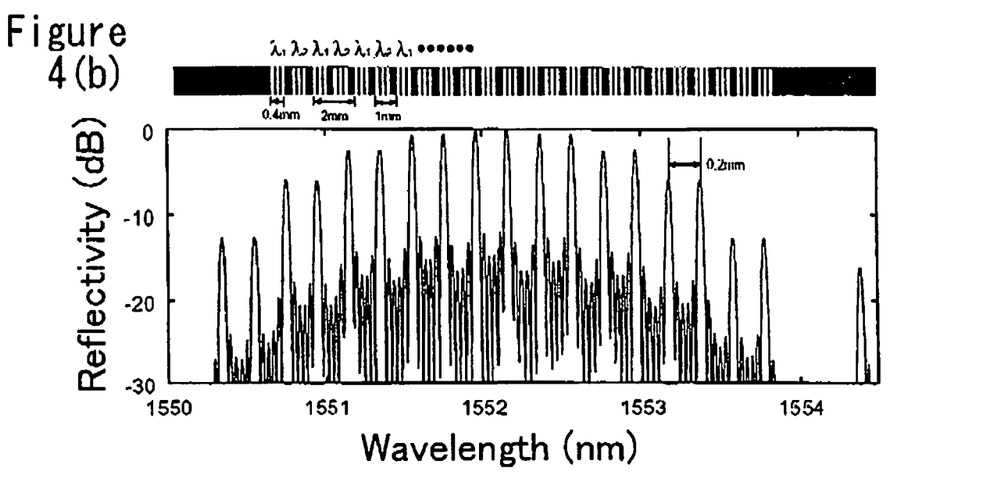
FIG. 4(b) shows the reflection characteristics of a superlattice type fiber grating using two types of FBG.

FIG. 4 shows the reflection characteristics of a superlattice type fiber grating. FIG. 4(a) shows one type of FBG that is 0.4 mm long and set at a pitch of 2 mm, and FIG. 4(b) shows the reflection characteristics two types of FBG, each 0.4 mm long and set at a pitch of 2 mm. As can be understood from the drawings, there is a high degree of freedom in designing comb-shaped reflection spectral characteristics.

FIG. 5 shows an embodiment of the invention in which this type of superlattice fiber grating is used in two output filters. As shown in FIG. 5(a), an optical modulator is provided between input filter FBGa and output filters FBGc and FBGd. In the case of this apparatus, two lightwaves are input and two modulation system signals are supplied. The two lightwaves are transmitted by the input filter, but sidebands produced by modulation of the lightwaves are reflected. In the example shown in FIG. 5, there are two lightwaves and two modulation signals, but the optical modulation apparatus can readily be realized even when the numbers are greater.

Figure 5B:
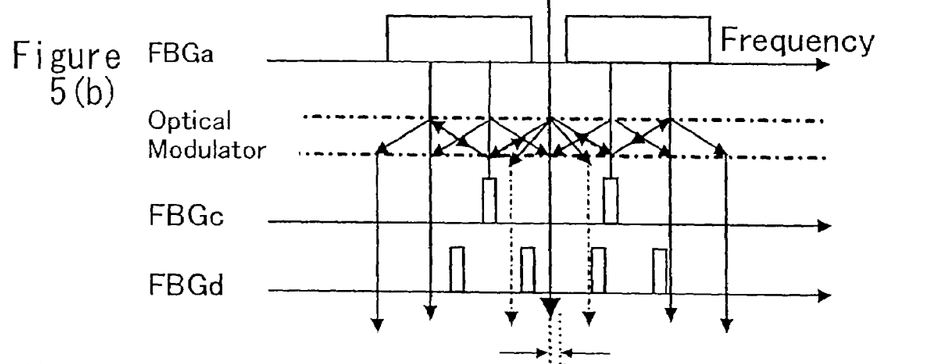

As shown by FIG. 5(b), the FBGa transmits input lightwaves but reflects sidebands obtained by modulating the lightwaves. For example, the lightwaves have frequencies of 200 THz ($\lambda$a) and 200.0005 THz ($\lambda$b), the input filter has a transmission bandwidth of 2 GHz and a reflection bandwidth of 200 THz±2 GHz to 200 THz±18 GHz. The $\lambda$a and $\lambda$b lightwaves are modulated at 8 GHz and 5 GHz, respectively. Also, the FSRs of the FBGc and FBGd are 16 GHz and 10 GHz, respectively.

Figure 5C:
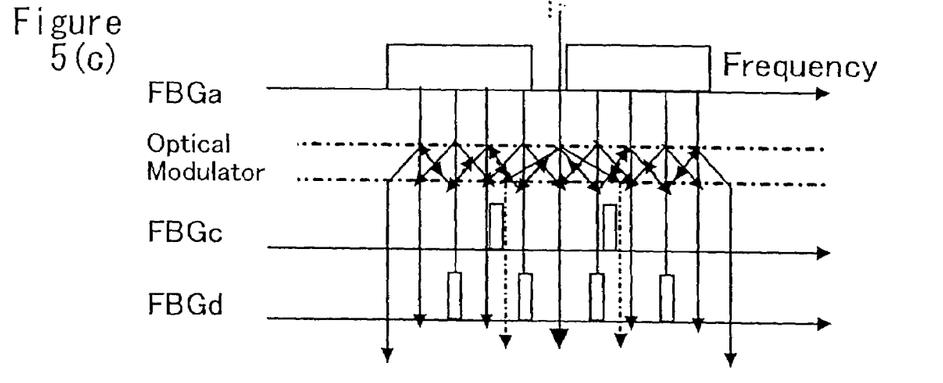
FIG. 5(c) shows the reflection characteristics with respect to incident light of wavelength λb.

The spectral reflection fringe of the FBGc is made to coincide with the location of sidebands produced by multiplex modulation of the $\lambda$a lightwave with an 8 GHz modulation signal. In the same way, the spectral reflection fringe of the FBGd is set to coincide with the location of sidebands produced by multiplex modulation of the $\lambda$b lightwave with a 5 GHz modulation signal. Sidebands produced by modulating the $\lambda$a lightwave with a 5 GHz signal and sidebands produced by modulating the $\lambda$b lightwave with an 8 GHz signal are sent to the output end after being subjected to just one modulation.

Sideband width increases when information is carried by the modulation signal, so it is necessary to set a fringe width that is wide enough to cover such a sideband. Here, to simplify the explanation, the modulation signal will be regarded as a simple sine wave, and the width of each fringe as being 200 MHz. The effective number of fringes can be determined by the structure of FBGc and FBGd. When the size of FBGc and FBGd can be increased, the number of effective reflection fringes can be decreased, as shown in FIG. 5, and sidebands located on the outside can be output. When the size cannot be increased, the sidebands expand over a wide band of wavelengths, so lightwaves that are output are those that can slip between fringes. In FIGS. 5(b) and 5(c), FBGc and FBGd are positioned to block odd-order sidebands.

Figure 6A:
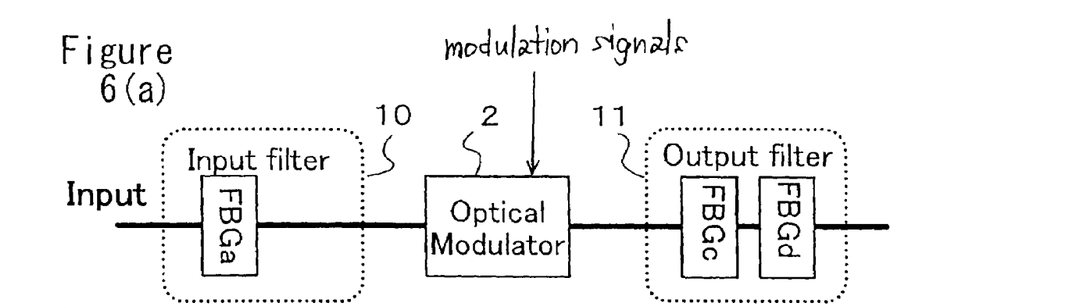
FIG. 6(a) is a schematic diagram of another embodiment of a multiple-wavelength optical modulation apparatus according to the present invention.
Figure 6B:
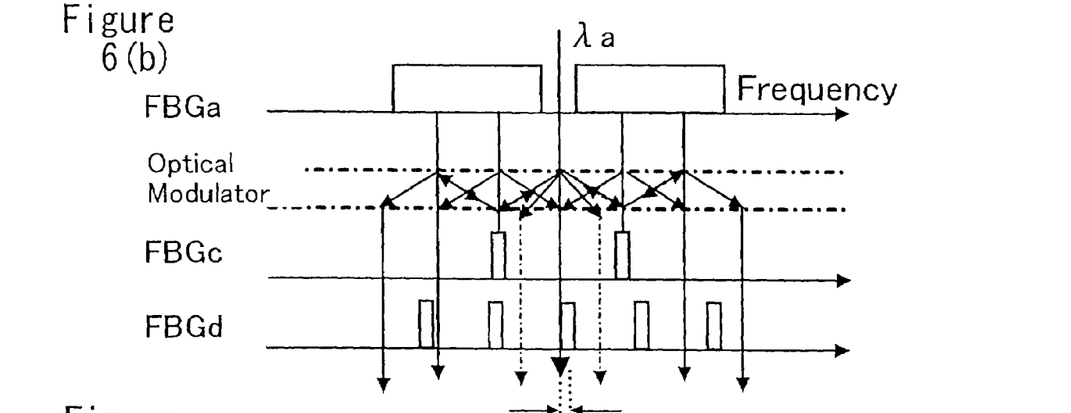
Figure 6C:
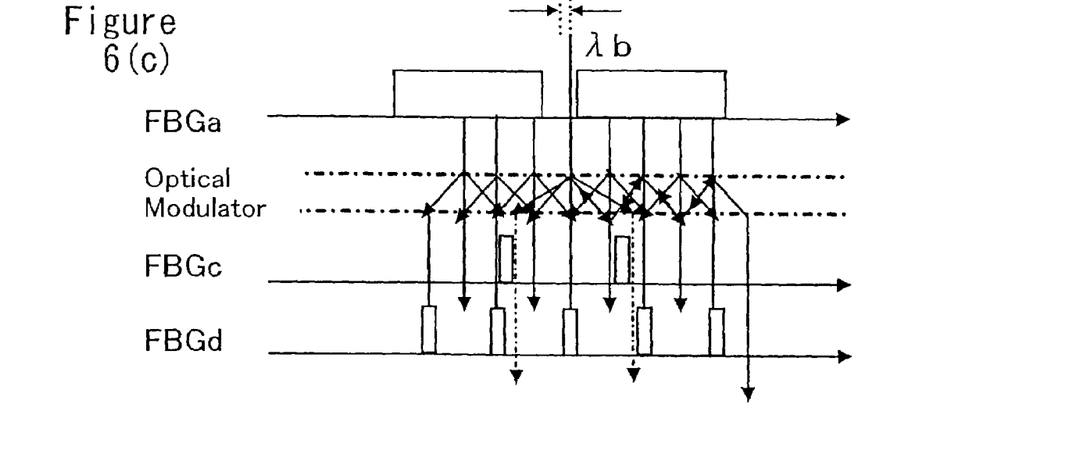
FIG. 6(c) shows the reflection characteristics with respect to incident light of wavelength λb.

In order to block even-number sidebands and output odd-number sidebands, fringes can be located in frequency locations that block the λb lightwave, as shown in FIG. 6(c). Using such a configuration makes it possible for the λa and λb lightwaves to be modulated by the respective modulation signals and to obtain even-order λa sidebands and odd-order λb sidebands. Output having a reverse combination can be readily obtained by changing fringe locations. Also, by adjusting the fringes in both directions to block zero-order lightwaves, even-order sidebands of either can be obtained.

Figure 7:
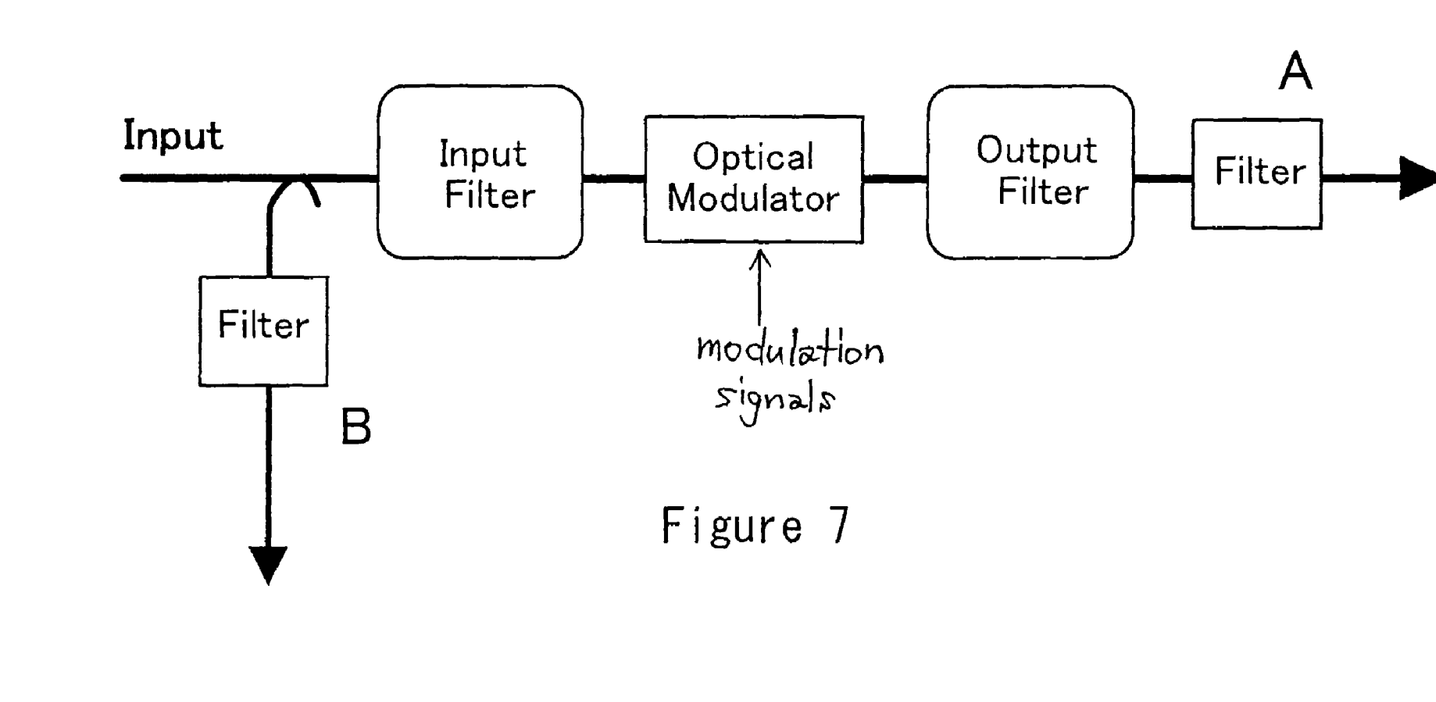
FIG. 7 is a block diagram of an arrangement for utilizing the optical modulation apparatus of the invention.

Various lightwaves are included in the case of the above modulation apparatus, such as sidebands of the λa lightwave modulated by an 8 GHz signal and sidebands of the λb lightwave modulated by a 5 GHz signal. Therefore, for practical application, with respect to FIG. 7, it is desirable to provide a filter at location A of an optical modulation apparatus that has an optical modulator bracketed by an input filter and an output filter, and output a lightwave with a specific frequency selected from among such lightwaves. When a newly provided filter produces a reflected wave, it is desirable to prevent interference with the reflected wave by giving lightwaves that make a round trip between the input filter and the newly provided filter a larger delay time than the period of either modulation signal.

In order to modulate the λa and λb lightwaves with the respective 8 GHz and 5 GHz signals in the case of the modulation apparatus of FIG. 5 or FIG. 6, as described above, it is necessary to match the period of the modulation signal, or harmonic thereof, with the time required for the optical signal making multiple round trips to make one round trip. This matching condition can be fulfilled by, for example, giving the input or output filter the delay time shown in FIG. 5(a). FBGa, FBGc and FBGd have a transmission delay time and reflection delay time of 100 psec and 50 psec, respectively. The optical paths on the FBGa and FBGd sides of FBGc are each assumed to have a propagation delay time of 50 psec. The delay time between the FBGa-FBGc connection ends is 150 psec. In this case the delay time for one round trip in multiple round-trip optical paths between FBGa and FBGc is 500 psec, and the delay time for one round trip in multiple round-trip optical paths between FBGa and FBGd is 800 psec. These values are respectively three and four times the period of an 8 GHz signal (125 psec period) and a 5 GHz signal (200 psec period).

When there is superposing of fringes of the FBGc and FBGd of FIGS. 5 and 6, sidebands of the λa lightwave modulated by the 5 GHz signal and sidebands of the λb lightwave modulated by the 8 GHz signal included in outputs can cause considerable crosstalk that is dependent on the frequency of superposition. In an actual environment where this crosstalk is acceptable, the above settings will be permissible.

EXAMPLE 3

Figure 8A:
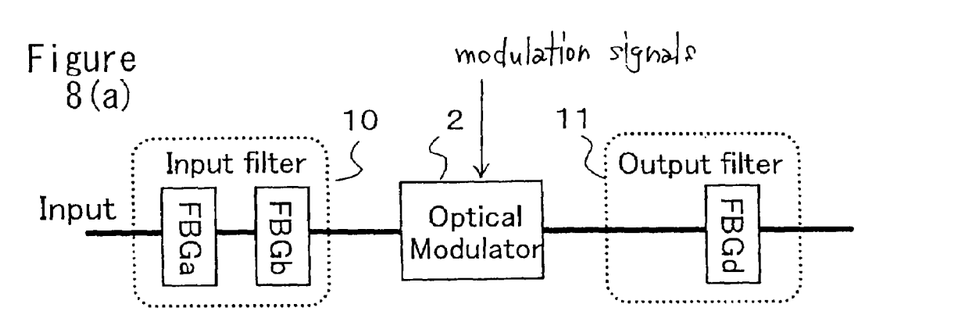
FIG. 8(a) shows an embodiment of the optical modulation apparatus using fiber gratings for two input filters.
Figure 8B:
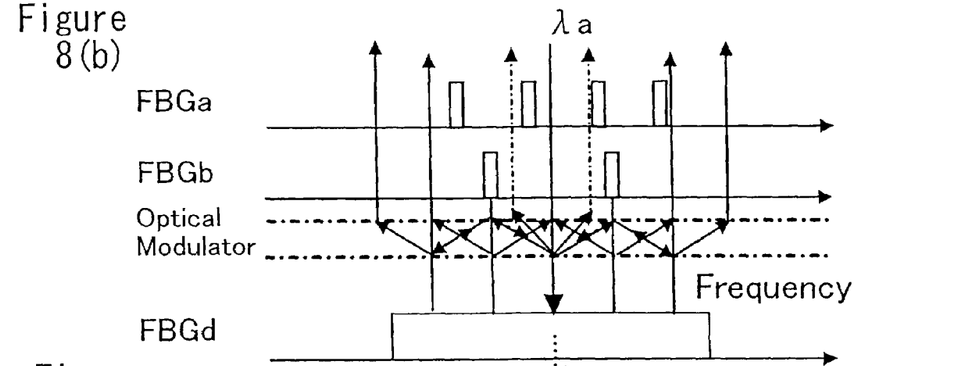
Figure 8C:
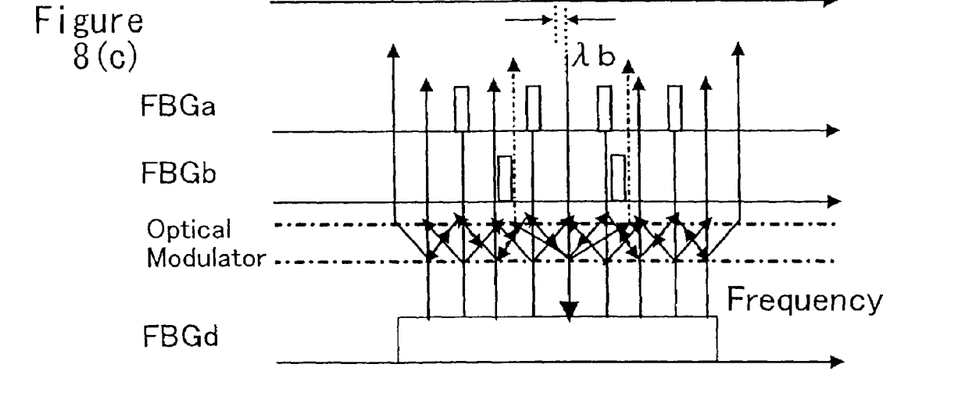
FIG. 8(c) shows the reflection characteristics with respect to incident light of wavelength λb.

While the above example relates to an apparatus that uses superlattice type fiber gratings to constitute two output filters, in the case of the embodiment shown in FIG. 8, superlattice type fiber gratings are used to constitute two input filters (FBGa and FBGb). In this case, FBGd can be a FBG with a continuous reflection characteristic. With respect to the fringes showing the reflection characteristics of FBGa and FBGb, ones satisfying the same conditions as in the case of the FBGc and FBGd of Example 2 may be used.

However, in the case of this example too, various lightwaves are included in the modulation apparatus, such as sidebands of the λa lightwave modulated by an 8 GHz signal and sidebands of the λb lightwave modulated by a 5 GHz signal. Therefore, for practical application, it is desirable to provide a filter at location B in FIG. 7 to output a lightwave with a specific frequency selected from among such lightwaves. As in the preceding example, when a filter that is added for this produces a reflected wave, it is desirable to prevent interference with the reflected wave by giving lightwaves that make a round trip between the input filter and the newly added filter a larger delay time than the period of either modulation signal.

EXAMPLE 4

Figure 9:
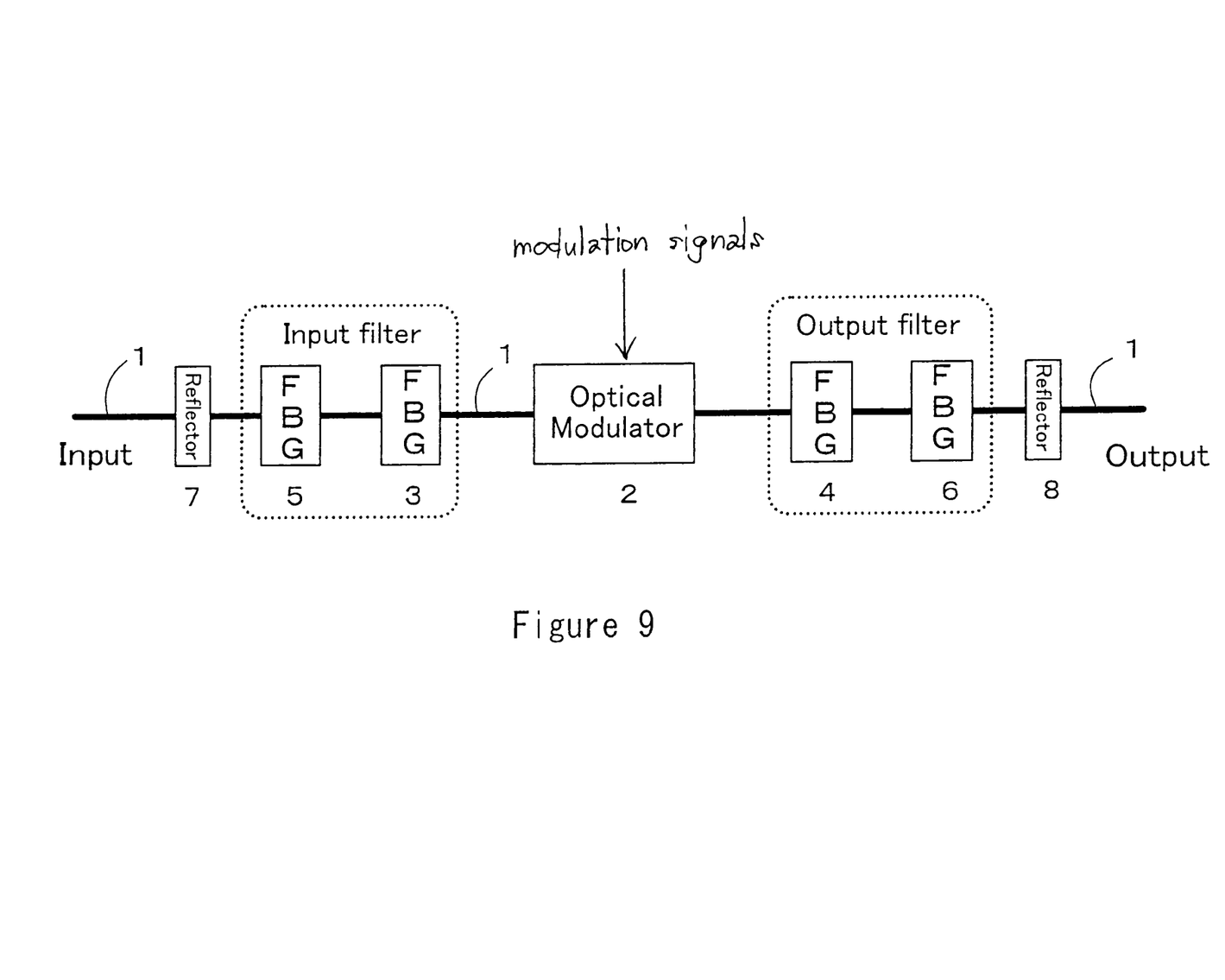
FIG. 9 shows an optical frequency comb generator configured using the optical modulation apparatus of FIG. 3.

FIG. 9 shows on optical frequency comb generator configured using the optical modulation apparatus of FIG. 3, with the apparatus being provided within the optical resonator. The resonator used has a good reflection characteristics and slight transparency, and may be a Fabry-Perot optical resonator or an optical resonator on an optical fiber using FBG reflectors. The comb generator has a feature that is not present in the prior art in providing equivalent modulation characteristics with a modulation at a frequency that is an integer multiple of the modulation frequency and, making it possible to simultaneously generate optical frequency combs from lightwaves having different frequencies.

The optical modulation apparatus of this invention can be applied to optical fiber wireless systems that use optical fibers to transmit milliwave signals, which would make it possible to reduce the number of modulators needed to modulate the optical signals. The optical modulation apparatus of the invention can also be used to configure optical frequency comb generators, enabling the simultaneous generation of frequency combs based on lightwaves having different wavelengths.

What is claimed is:

1. An optical modulation apparatus which modulates plural input lightwaves having different frequencies by their respective modulation signals, and in which with respect to a natural number n that is not higher than a number N of modulation signals that are varied and is not lower than a number of the plural input lightwaves, for each varied n, fn is an input light component of a channel n, Fn is a modulation frequency, An is a lower sideband order and Bn is an upper sideband order corresponding to sideband channels generated by modulation, the apparatus comprising:

an input filter, an optical modulator configured to receive the plural modulation signals applied simultaneously thereto, and an output filter disposed on a single optical path;

a multiple round-trip optical path formed by the plural input lightwaves that are input through the input filter, modulated into a signal having the input light component fn with a sideband by the optical modulator using a modulation signal having the modulation frequency Fn, reflected in round trips by the input filter and output filter, and subjected to a modulation performed by the optical modulator each time the lightwaves make a round trip, wherein an optical signal with a sideband having a frequency which has reached a frequency determined by the output filter or the input filter from among sidebands An and Bn generated by the modulation is output through the output filter or the input filter, wherein the modulation frequency Fn is determined by a transmission time of the input filter, a reflection time of the output filter, and a length of an optical path between the input filter and the output filter, and wherein the time required for each light component of channel n to make a round trip is an integer multiple of one period of each modulation signal (=1/Fn).

2. The apparatus according to claim 1, wherein the optical modulator reverse-phase modulates a light component travelling in one direction when the time required for each light component of channel n to make a round trip is an odd multiple of one period (=1/Fn), and in-phase modulates a light component travelling in both directions when the time required for each light component of channel n to make a round trip is an even multiple of one period (=1/Fn).

3. The apparatus according to claim 2, comprising a plurality of unit configurations each constituted by an output filter element having a predetermined reflection band, and an input filter element having first and second reflection bands each of which has a reflection frequency band in common with the predetermined reflection band and a transmission band between the first and second reflection bands; wherein the plurality of unit configurations, the output filter elements of which each have a different reflection band, are disposed on a single optical path and share the same intensity modulator or phase modulator.

4. The apparatus according to claim 3 that uses an intensity modulator with a resonant type modulation electrode or a phase modulator.

5. The apparatus according to claim 3 that uses a traveling wave type intensity modulator or a traveling wave type phase modulator.

6. The apparatus according to claim 2, wherein the input filter is a filter having first and second reflection bands and a transmission band between the first and second reflection bands via which light is input, and the output filter has comb-teeth-shaped reflection characteristic portions in which the number of comb teeth is the same as the number of modulation signals;

the comb-teeth-shaped reflection characteristic portions each have a free spectral range reflection characteristic that is a natural number multiple of each modulation frequency or is a natural-number-part-of-one of each modulation frequency, and any among a carrier wave, a first order sideband and a higher order sideband obtained by modulation of an input lightwave being reflected by a comb-teeth-shaped reflection characteristic portion that is different for each modulation signal.

7. The apparatus according to claim 6 that uses an intensity modulator with a resonant type modulation electrode or a phase modulator.

8. The apparatus according to claim 6 that uses a traveling wave type intensity modulator or a traveling wave type phase modulator.

9. The apparatus according to claim 2, wherein the output filter is a filter having a predetermined reflection band configured to reflect the input lightwaves;

the input filter has comb-teeth-shaped reflection characteristic portions in which the number of comb teeth is the same as the number of modulation signals;

the comb-teeth-shaped reflection characteristic portions each have a free spectral range reflection characteristic that is a natural number multiple of two or more of each modulation frequency;

any among a carrier wave, a first order sideband and a higher order sideband obtained by two modulations of an input lightwave being reflected by a comb-teeth-shaped reflection characteristic portion that is different for each modulation signal.

10. The apparatus according to claim 9 that uses an intensity modulator with a resonant type modulation electrode or a phase modulator.

11. The apparatus according to claim 9 that uses a traveling wave type intensity modulator or a traveling wave type phase modulator.

12. The apparatus according to claim 2 that uses an intensity modulator with a resonant type modulation electrode or a phase modulator.

13. The apparatus according to claim 2 that uses a traveling wave type intensity modulator or a traveling wave type phase modulator.

\* \* \* \* \*